US008826640B2

(12) United States Patent
Olden et al.

(10) Patent No.: US 8,826,640 B2
(45) Date of Patent: Sep. 9, 2014

(54) FLIGHT VEHICLES INCLUDING ELECTRICALLY-INTERCONNECTIVE SUPPORT STRUCTURES AND METHODS FOR THE MANUFACTURE THEREOF

(75) Inventors: Thomas A. Olden, Tucson, AZ (US); Walter Wrigglesworth, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 851 days.

(21) Appl. No.: 12/945,440

(22) Filed: Nov. 12, 2010

(65) Prior Publication Data

US 2012/0117941 A1    May 17, 2012

(51) Int. Cl.
*B64G 1/40* (2006.01)
*B64G 1/26* (2006.01)
*F42B 10/66* (2006.01)
*F02K 9/34* (2006.01)

(52) U.S. Cl.
CPC .......... *B64G 1/403* (2013.01); *B64G 1/26* (2013.01); *F42B 10/661* (2013.01)
USPC ................ 60/253; 60/255; 60/256; 244/3.21; 244/3.22

(58) Field of Classification Search
CPC ........ B64G 1/26; B64G 1/403; F42B 10/661; F02K 9/34
USPC .............. 60/253, 255, 256; 244/39.21, 39.12, 244/3.21, 12.4, 12.5; 239/265.15, 265.19
See application file for complete search history.

(56) References Cited

U.S. PATENT DOCUMENTS

| 2,986,001 A | | 5/1961 | Green |
| 3,023,570 A | | 3/1962 | Crouch et al. |
| 3,093,964 A | | 6/1963 | Hausmatm |
| 3,133,773 A | * | 5/1964 | Ecker .............................. 439/75 |
| 3,226,928 A | | 1/1966 | Webb et al. |
| 3,248,875 A | | 5/1966 | Wolcott |
| 3,250,070 A | * | 5/1966 | Milewski et al. ............... 60/770 |

(Continued)

FOREIGN PATENT DOCUMENTS

| DE | 10239347 A1 | 3/2004 |
| EP | 1111971 A1 | 6/2001 |

(Continued)

OTHER PUBLICATIONS

PCT International Preliminary Report on Patentability, IPRP, International Application No. PCT/US2011/053100; Search Report and Written Opinion; International Filing Date: Sep. 23, 2011; Date of Mailing: May 23, 2013; pp. 1-7.

(Continued)

*Primary Examiner* — William H Rodriguez
*Assistant Examiner* — Carlos A Rivera
(74) *Attorney, Agent, or Firm* — Cantor Colburn LLP (57) ABSTRACT

Embodiments of a flight vehicle are provided, as are embodiments of a method for manufacturing a flight vehicle. In one embodiment, the flight vehicle includes a solid-propellant rocket motor, control circuitry, and an electrically-interconnective support structure. The electrically-interconnective support structure includes a load-bearing frame and a plurality of electrical conductors embedded within the load-bearing frame. The solid-propellant rocket motor is mounted to the load-bearing frame, and the plurality of electrical conductors embedded within the frame electrically couples the solid-propellant rocket motor to the control circuitry.

12 Claims, 7 Drawing Sheets

(56) References Cited

U.S. PATENT DOCUMENTS

| | | | |
|---|---|---|---|
| 3,316,718 A | | 5/1967 | Webb et al. |
| 3,367,268 A | * | 2/1968 | Spenadel et al. ............. 102/289 |
| 3,385,063 A | | 5/1968 | Brown |
| 3,393,517 A | | 7/1968 | Altman |
| 3,397,539 A | | 8/1968 | Schubert |
| 3,442,084 A | | 5/1969 | Dilchert |
| 3,527,168 A | | 9/1970 | McCurdy et al. |
| 3,555,825 A | | 1/1971 | Dilchert |
| 3,581,662 A | | 6/1971 | Grebert |
| 3,584,461 A | | 6/1971 | Debize |
| 3,595,025 A | | 7/1971 | Stockel et al. |
| 3,698,183 A | | 10/1972 | MacDonald et al. |
| 3,992,877 A | | 11/1976 | Granger |
| 4,007,688 A | | 2/1977 | Franz |
| 4,249,673 A | | 2/1981 | Katoh et al. |
| 4,345,427 A | | 8/1982 | Whitesides, Jr. |
| 4,357,795 A | | 11/1982 | Bastian et al. |
| 4,364,531 A | | 12/1982 | Knoski |
| 4,505,180 A | | 3/1985 | Hinrichs |
| 4,539,910 A | | 9/1985 | Stevens |
| 4,738,100 A | | 4/1988 | Koorey |
| 4,972,673 A | | 11/1990 | Carrier |
| 4,979,697 A | | 12/1990 | Kranz |
| 5,024,160 A | | 6/1991 | Canterberry et al. |
| 5,062,593 A | | 11/1991 | Goddard et al. |
| 5,160,070 A | | 11/1992 | Hibler et al. |
| 5,211,358 A | | 5/1993 | Bagley |
| 5,220,488 A | | 6/1993 | Denes |
| 5,238,204 A | * | 8/1993 | Metz ............................ 244/3.15 |
| 5,433,399 A | | 7/1995 | Becker et al. |
| 5,440,993 A | | 8/1995 | Osofsky |
| 5,456,425 A | | 10/1995 | Morris et al. |
| 5,608,183 A | | 3/1997 | Barnes et al. |
| 5,613,358 A | | 3/1997 | Humiston et al. |
| 5,647,558 A | | 7/1997 | Linick |
| 5,675,966 A | | 10/1997 | Dombrowski et al. |
| 5,765,367 A | | 6/1998 | Denoel et al. |
| 5,853,143 A | * | 12/1998 | Bradley et al. ............... 244/3.21 |
| 5,959,235 A | | 9/1999 | Wagstaff |
| 6,045,638 A | | 4/2000 | Lundstrom |
| 6,202,037 B1 | | 3/2001 | Hattori et al. |
| 6,244,535 B1 | * | 6/2001 | Felix ............................ 244/3.16 |
| 6,352,030 B1 | | 3/2002 | Doll et al. |
| 6,357,357 B1 | | 3/2002 | Glasser |
| 6,502,785 B1 | | 1/2003 | Teter et al. |
| 6,554,936 B1 | | 4/2003 | Metcalf et al. |
| 6,629,362 B2 | | 10/2003 | Kobayashi et al. |
| 6,647,888 B1 | | 11/2003 | Cesaroni et al. |
| 6,692,655 B1 | | 2/2004 | Martins et al. |
| 6,713,688 B2 | | 3/2004 | Kokufu et al. |
| 6,739,121 B2 | | 5/2004 | Kline et al. |
| 6,745,696 B1 | | 6/2004 | Rotkopf |
| 6,869,665 B2 | | 3/2005 | Tani et al. |
| 6,895,991 B2 | | 5/2005 | Woessner |
| 6,968,676 B1 | | 11/2005 | Krishnan |
| 7,000,377 B1 | | 2/2006 | Knight |
| 7,003,942 B2 | | 2/2006 | Le Helley et al. |
| 7,022,196 B2 | | 4/2006 | Cesaroni et al. |
| 7,194,852 B1 | | 3/2007 | Krishnan |
| 7,258,936 B2 | | 8/2007 | Zheng et al. |
| 7,281,367 B2 | | 10/2007 | Rohrbaugh et al. |
| 7,312,401 B2 | | 12/2007 | Tsukada et al. |
| 7,442,879 B2 | | 10/2008 | Das et al. |
| 7,685,940 B1 | | 3/2010 | Cavalleri et al. |
| 7,737,367 B2 | | 6/2010 | Koyama et al. |
| 7,886,519 B2 | | 2/2011 | Woessner et al. |
| 7,947,938 B2 | | 5/2011 | Dryer |
| 8,015,920 B1 | | 9/2011 | Wilkinson et al. |
| 8,144,478 B1 | | 3/2012 | Hayward |
| 2001/0003294 A1 | | 6/2001 | Mahaffy |
| 2002/0053377 A1 | | 5/2002 | Martin et al. |
| 2002/0129808 A1 | | 9/2002 | Manner |
| 2002/0157557 A1 | | 10/2002 | Cesaroni et al. |
| 2002/0195181 A1 | | 12/2002 | Lundstrom et al. |
| 2003/0200656 A1 | * | 10/2003 | Wilson ....................... 29/890.01 |
| 2004/0109039 A1 | | 6/2004 | Kojima et al. |
| 2004/0244890 A1 | | 12/2004 | Cesaroni et al. |
| 2005/0048808 A1 | | 3/2005 | Black et al. |
| 2005/0188677 A1 | | 9/2005 | Nyberg et al. |
| 2007/0044450 A1 | | 3/2007 | Kuninaka |
| 2008/0216462 A1 | | 9/2008 | Woessner et al. |
| 2008/0295327 A1 | | 12/2008 | Aeling et al. |
| 2009/0046441 A1 | | 2/2009 | Funaya et al. |
| 2009/0235640 A1 | | 9/2009 | Cavalleri et al. |
| 2010/0011742 A1 | | 1/2010 | Cavalleri et al. |
| 2010/0032516 A1 | | 2/2010 | Olden et al. |
| 2010/0044096 A1 | | 2/2010 | Kuczynski et al. |
| 2010/0122843 A1 | | 5/2010 | Yokouchi et al. |
| 2010/0327106 A1 | | 12/2010 | Brinkerhoff et al. |
| 2011/0024165 A1 | * | 2/2011 | Olden et al. .................. 174/257 |
| 2012/0036831 A1 | | 2/2012 | Olden et al. |

FOREIGN PATENT DOCUMENTS

| | | |
|---|---|---|
| EP | 1843124 A1 | 10/2007 |
| GB | 1605168 A | 9/1982 |
| GB | 2124035 A | 2/1984 |
| WO | 2002017690 A1 | 2/2002 |
| WO | 2008056500 A1 | 5/2008 |
| WO | 2009151796 A2 | 12/2009 |

OTHER PUBLICATIONS

Olden, Thomas A. et al. "Systems and Methods for Composite Structures with Embedded Interconnects," U.S. Appl. No. 12/606,462, filed Oct. 27, 2009.

Olden, Thomas A. et al. "Pellett-Loaded Multiple-Impulse Rocket Motor," U.S. Appl. No. 12/391,216, filed Feb. 23, 2009.

European Patent Office, International Searching Authority, "International Search Report and Written Opinion," mailed Dec. 8, 2009; International Application No. PCT/US2009/033248 filed Feb. 5, 2009.

European Patent Office, International Searching Authority, "International Search Report and Written Opinion," mailed Dec. 7, 2009; International Application No. PCT/US2009/033694 filed Feb. 10, 2009.

European Patent Office, International Searching Authority, "International Search Report," mailed Jul. 26, 2010; International Application No. PCT/US2010/028164 filed Mar. 22, 2010.

U.S. Appl. No. 12/606,462; Final Office Action; Date Filed: Oct. 27, 2009; Date Mailed: Apr. 9, 2012; pp. 1-20.

PCT—International Preliminary Report on Patentability; International Application No. PCT/US2010/028164; International Filing Date: Mar. 22, 2010; Date of Mailing: Feb. 9, 2012; pp. 1-2.

PCT—Written Opinion—IPRP; International Application No. PCT/US2010/028164; International Filing Date: Mar. 22, 2010; Date of Mailing: Feb. 9, 2012; pp. 1-5.

David H. Lewis, et al., "Digital MicroPropulsion," Micro Electro Mechanical Systems, Twelfth IEEE International Conference; pp. 517-522; Jan. 1999.

International Search Report; International Application No. PCT/US2011/053100; International Filing Date: Sep. 23, 2011; Date of Mailing: Feb. 2, 2012; pp. 1-6.

International Search Report—Written Opinion; International Application No. PCT/US2011/053100; International Filing Date: Sep. 23, 2011; Date of Mailing: Feb. 2, 2012; pp. 1-7.

PCT—International Search Report and Written Opinion; International Application No. PCT/US2010/028164; International Filing Date; Mar. 22, 2010; Date of Mailing; Jan. 31, 2012, pp. 1-7.

* cited by examiner

FLIGHT VEHICLES INCLUDING ELECTRICALLY-INTERCONNECTIVE SUPPORT STRUCTURES AND METHODS FOR THE MANUFACTURE THEREOF

TECHNICAL FIELD

The following disclosure relates generally to flight vehicles and, more particularly, to embodiments of a flight vehicle including an electrically-interconnective support structure, as well as to methods for manufacturing such a flight vehicle.

BACKGROUND

Certain flight vehicles are equipped with Divert and Attitude Control Systems, which provide position and attitude adjustments on an as-needed basis (the term "flight vehicle" encompassing both vehicles designed to operate within and/or outside of earth's atmosphere). Conventional Divert and Attitude Control Systems often employ an array of thrusters, a fluid fuel source, and an oxidizing agent, which supports combustion of the fluid fuel source. The fluid fuel source is typically stored under pressure in one or more fuel tanks, and the oxidizing agent is stored in a separate oxidizer tank. Plumbing fluidly connects the fuel tanks, the oxidizer tank, and the thruster array; and a valve system controls the flow of fuel and oxidizing agent to the thruster array to enable each thruster to be independently and intermittently fired. The valve system is, in turn, controlled by control circuitry, which may determine the appropriate manner in which to adjust the flight vehicle's position and attitude based upon data generated by sensors deployed onboard the flight vehicle (e.g., an Inertial Measurement Unit and at least one electromagnetic radiation sensor) and/or by telemetry data provided by a remote source.

Conventionally-implemented Divert and Attitude Control Systems of the type described above are limited in certain respects due, in part, to their reliance on fluid fuel sources. To safely retain the fluid fuel under pressure, the tanks in which the fluid fuel is stored are typically fabricated to have a thick-walled construction and are consequently relatively heavy and bulky. The fluid fuel, itself, adds considerable weight to the flight vehicle, as do the various the other components (e.g., the plumbing network, valve system, and oxidizer tank) required to support the usage of a fluid fuel source. Collectively, such components undesirably increase the non-essential mass (commonly referred to as the "parasitic mass"), cost, and overall complexity of the flight vehicle.

It is thus desirable to provide embodiments of a flight vehicle including a Divert and Attitude Control System that overcomes the above-noted limitations associated with conventional, fluid fuel-based Divert and Attitude Control Systems. More generally, it is desirable to provide embodiments of a flight vehicle that is relatively lightweight, that has a reduced part count, and that can be readily outfitted with different components and sensor suites depending upon desired mission capabilities. It would also be desirable if such a flight vehicle were amenable to automated manufacturing processes to minimize manually-introduced system faults, to decrease the likelihood of contamination by foreign object debris, and to reduce overall production costs. Lastly, it would be desirable to provide embodiments of a method for manufacturing such a flight vehicle. Other desirable features and characteristics of the present invention will become apparent from the subsequent Detailed Description and the appended Claims, taken in conjunction with the accompanying Drawings and this Background.

BRIEF SUMMARY

Embodiments of a flight vehicle are provided, as are embodiments of a method for manufacturing a flight vehicle. In one embodiment, the flight vehicle includes a solid-propellant rocket motor, control circuitry, and an electrically-interconnective support structure. The electrically-interconnective support structure includes a load-bearing frame and a plurality of electrical conductors embedded within the load-bearing frame. The solid-propellant rocket motor is mounted to the load-bearing frame, and the plurality of electrical conductors embedded within the frame electrically couples the solid-propellant rocket motor to the control circuitry.

Embodiments of a method for manufacturing a flight vehicle are further provided. In one embodiment, the method includes the step of fabricating an electrically-interconnective support structure including a load-bearing frame and a plurality of electrical conductors embedded within the load-bearing frame. A solid-propellant rocket motor is mounted to the load-bearing frame in a predetermined position to electrically couple the solid-propellant rocket motor to the plurality of electrical conductors embedded within the load-bearing frame.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description. As appearing herein, the term "flight vehicle" is utilized to denote any maneuverable vehicle operable within and/or outside of the earth's atmosphere including, but not limited to, exoatmospheric maneuvering vehicles and kill vehicles utilized in the tracking and/or neutralization of airborne threats, such as ballistic missiles.

The present Assignee, the Raytheon Company currently headquartered in Waltham, Mass., has developed and continues to develop a Divert and Attitude Control System that utilizes a solid fuel material in place of a conventionally-utilized fluid fuel source. Usage of solid fuel material mitigates many of the limitations associated with conventional fluid fuel-based Divert and Attitude Control Systems of the type described in the foregoing section entitled "Background." For example, usage of solid fuel enables the elimination of the fuel tanks and various other bulky components utilized within conventional fluid fuel-based Divert and Attitude Control Systems and thereby enables a significant reduction in the mass of the flight vehicle.

In preferred implementations, the solid fuel-based Divert and Attitude Control System employs thrusters or rocket motors containing solid fuel in, for example, a pelletized form. The rocket motors are preferably arranged in an array including multiple rows of rocket motors, each circumferentially-spaced about the longitudinal axis of the flight vehicle. Control circuitry is operably coupled to each rocket motor included within the array. In certain cases, the control circuitry is operably coupled to the rocket motors utilizing conventional wired connections. More specifically, discrete wiring is utilized to electrically couple the controller electronics to terminals provided on the innermost end of the rocket motor, which are, in turn, electrically coupled to an ignition device positioned within the rocket motor casing adjacent the solid fuel pellets. Several hundred rocket motors are often included within the array, and the innermost ends of the rocket motors may be positioned adjacent one another in a relatively confined space. Discrete wiring of the rocket motors is generally not amenable to automation and, consequently, must typically be performed as a manual operation. Manual wiring of the rocket motors to the control circuitry, which may require the hand soldering of several hundred or thousand electrical connections, is an extensive and tedious manual task. The extensive nature of the manual wiring process increases the likelihood of introduction of foreign object debris and faults into the system, and renders testing and fault detection excessively difficult. In addition, the usage of several hundred insulated wires to connect the rocket motors to the control circuitry adds undesirable parasitic mass to the flight vehicle.

Embodiments of the flight vehicle described herein employ a unique electrically-interconnective support structure, which electrically couples control circuitry to a rocket motor array without the usage of independent or discrete wiring. In addition, the electrically-interconnective support structure physically supports the control circuitry and the rocket motor array to maintain each of the rocket motors at a desired spatial position during vehicle flight and maneuvering. The electrically-interconnective support structure may also support additional electronic devices deployed onboard the flight vehicle, which may be selected based upon desired mission capabilities. In certain embodiments, the flight vehicle will assume the form of an exoatmospheric maneuvering vehicle or kill vehicle, and the rocket motor array will function as a Divert and Attitude Control System. It is, however, emphasized that embodiments of the flight vehicle are by no means limited to implementation as an exoatmospheric maneuvering or kill vehicle and may, instead, comprise any vehicle designed to operate within and/or outside of the earth's atmosphere. Furthermore, embodiments of the rocket motor array can be utilized to provide any desired propulsive function or functions and, therefore, may not be designed to perform both attitude and positional adjustments in all implementations.

Figure 1:
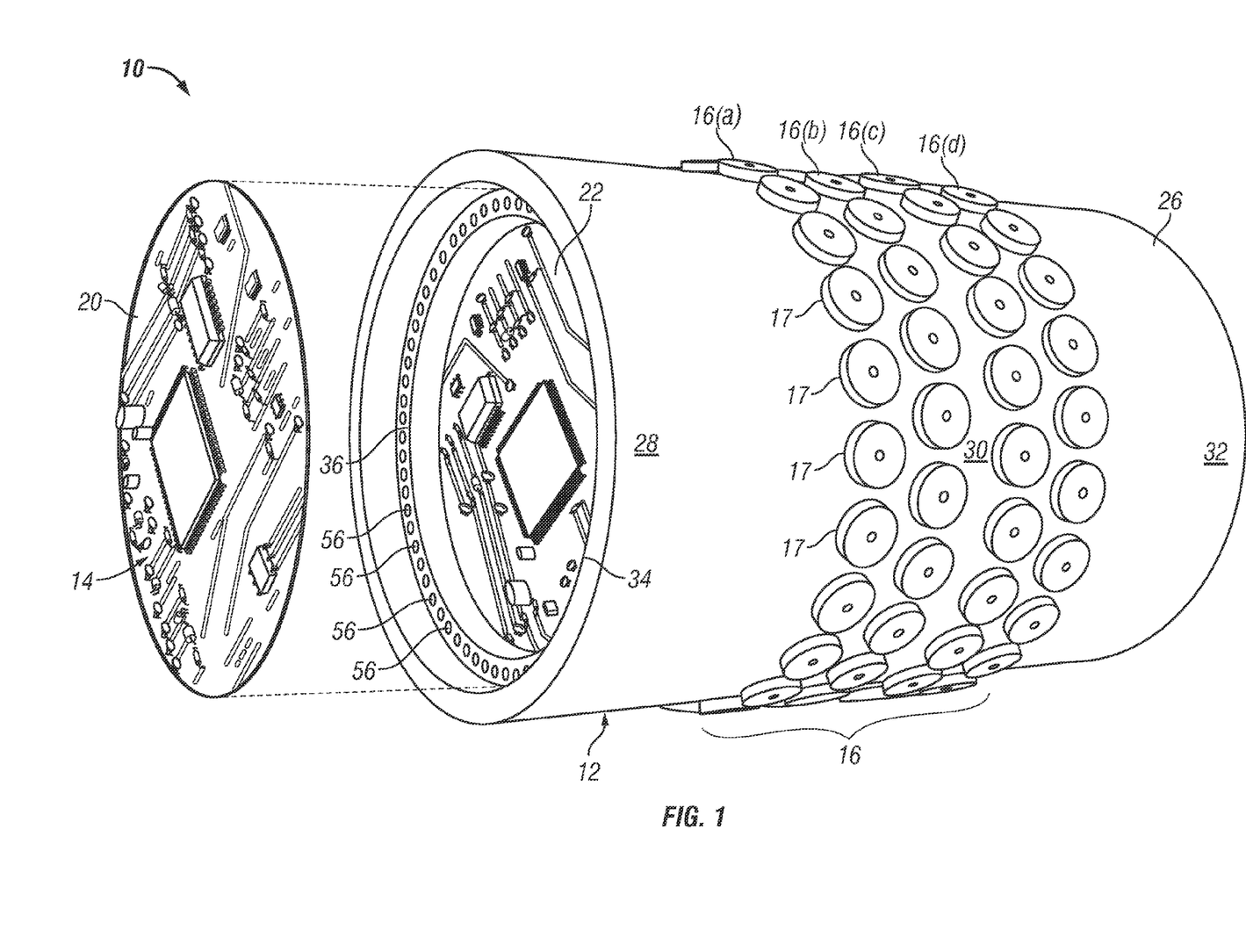
FIGS. 1 and 2 are partially-exploded isometric and side cutaway views, respectively, of a flight vehicle including an electrically-interconnective support structure and illustrated in accordance with an exemplary embodiment.
Figure 2:
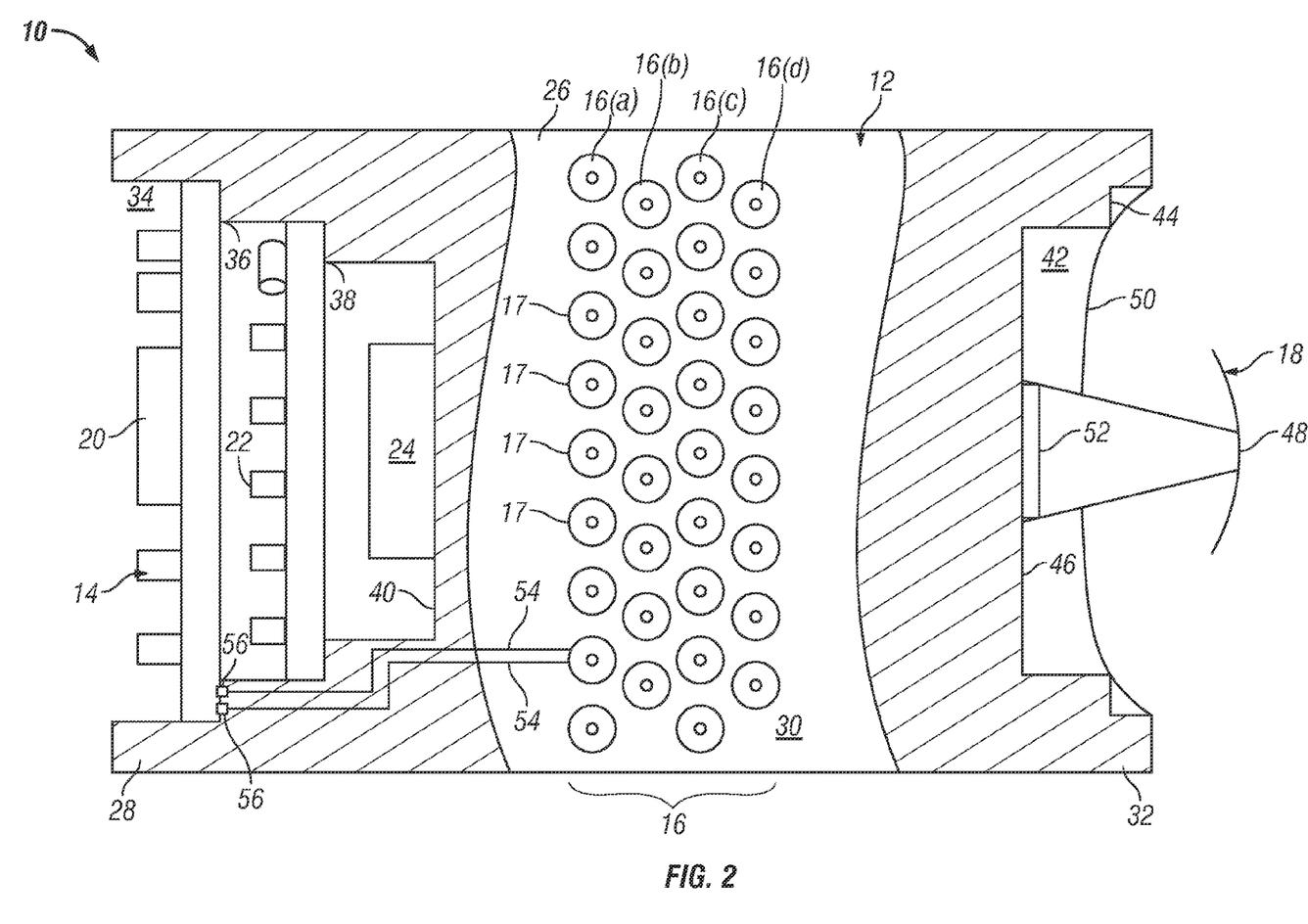

FIGS. 1 and 2 are partially-exploded isometric and side cutaway views, respectively, of a flight vehicle 10 in accordance with an exemplary embodiment of the present invention. As shown in FIGS. 1 and 2, flight vehicle 10 includes electrically-interconnective support structure 12, control circuitry 14, and a rocket motor array 16. Embodiments of flight vehicle 10 may also be equipped with various additional components that are well-known within the aerospace and munition industries and not shown in FIGS. 1 and 2 for clarity. Such components include, but are not limited to, power supplies, individual electromagnetic radiation sensors and sensor suites, telemetry units and antennae, onboard navigational systems (e.g., global positioning systems and/or inertial navigational systems), cryogenic cooling systems, and threat neutralization systems. As a specific example, flight vehicle 10 may be further equipped with an optical sensor system, such as optical sensor system 18 shown in FIG. 2. In view of the highly modular and adaptable nature of electrically-interconnective support structure 12, flight vehicle 10 can be equipped with various different types and combinations of components to achieve a broad range of mission capabilities.

Electrically-interconnective support structure 12 includes a substantially rigid, load-bearing frame 26 having a first end portion 28, an intermediate portion 30, and a second end portion 32 substantially opposite first end portion 28. Load-bearing frame 26 is preferably formed as a unitary or monolithic structure from a composite material, such as a woven material of the type described below. In the illustrated example, load-bearing frame 26 is imparted with elongated, generally cylindrical geometry. This notwithstanding, the particular shape and dimensions of load-bearing frame 26 will inevitably vary amongst different embodiments; e.g., in certain embodiments, frame 26 may be imparted with a polygonal outer profile that closely approximates a circular profile. Similarly, the dimensions of frame 26 may be scaled, as appropriate, to accommodate flight vehicles and thruster arrays of varying sizes.

Electrically-interconnective support structure 12 provides at least two structural functions. First, electrically-interconnective support structure 12 serves as a platform for rocket motor array 16, control circuitry 14, optical sensor system 18, and/or any other electronic components included within flight vehicle 10. With respect to array 16, in particular, support structure 12 maintains the relative positioning of the rocket motors included within array 16 during vehicle flight and maneuvering. Second, electrically-interconnective support structure 12 electrically couples control circuitry 14 to each of the rocket motors included within array 16. In so doing, electrically-interconnective support structure 12 eliminates the need for discrete wiring, which may otherwise be utilized to electrically couple control circuitry 14 to the rocket motors within array 16. As noted above, such discrete wiring typically requires extensive manual assembly (e.g., the hand soldering of several hundred wired connections), increases the likelihood of contamination by foreign object debris, and adds undesirable parasitic mass to the flight vehicle. By allowing the integration of dissimilar components, electrically-interconnective support structure 12 enhances the performance characteristics and mission capabilities of flight vehicle 10. As a further advantage, electrically-interconnective support structure 12 allows some or all of the major components included within flight vehicle 10 to be mounted to structure 12 and subsequently integrated into its mating subsystem in a highly controllable, stepped manufacturing process. Manufacturing processes suitable for the production of flight vehicle 10, generally, and electrically-interconnective support structure 12, specifically, are described below in conjunction with FIG. 4.

Rocket motor array 16 preferably includes at least one row of rocket motors angularly-spaced about intermediate portion 30 of load-bearing frame 26 or, more generally, about an intermediate portion of flight vehicle 10. For example, as indicated in FIG. 1, rocket motor array 16 may include four rows of rocket motors 16(a)-16(b), each of which is circumferentially-spaced about the longitudinal axis of structure 12. As will be described in detail below in conjunction with FIG. 3, each rocket motor included within array 16 contains a solid propellant, such as a plurality of solid fuel pellets. By design, solid-propellant rocket motors are single use devices. Consequently, the inclusion of multiple rows of rocket motors within array 16 provides redundancy and enables the repeat performance of additional thrust maneuvers (e.g., attitude and/or positional adjustments) after expenditure of certain rocket motors included within array 16.

Although by no means limited to such a mounting configuration, electrically-interconnective support structure 12 is preferably formed to include a plurality of radial openings 17 (five of which are labeled in FIGS. 1 and 2) provided through the outer annular wall of structure 12 and into which the rocket motors included within array 16 extend; e.g., during manufacture, structure 12 may first be independently produced to include radial openings 17 at predetermined positions, and the rocket motors may then be individually inserted into openings 17 during a subsequent assembly process. In the illustrated example, rocket motor array 16 includes approximately ninety-six rocket motors, with each rocket motor row 16(a)-16(d) containing twenty-four substantially identical rocket motors. In other implementations of flight vehicle 10, the rocket motor array may include several hundred rocket motors of varying shapes, sizes, and functionalities; e.g., in certain embodiments, rocket motor array 16 may include several hundred larger divert thrusters for adjusting the position of the flight vehicle, as well as several hundred smaller attitude control thrusters for adjusting the orientation of flight vehicle 10.

By way of example, control circuitry 14 is generically illustrated in FIGS. 1 and 2 as including a first printed circuit board ("PCB") 20, a second PCB 22, and a power supply 24 (shown in FIG. 2). However, it will be appreciated that control circuitry 14 may include any number of conventionally-known devices suitable for selectively actuating the rocket motors included within array 16 to provide attitude and/or positional adjustments and for performing other functionality that may be required by a given mission. In this regard, control circuitry 14 may comprise, or be associated with, various combinations of microprocessors, navigational equipment, memories, power supplies, storage devices, interface cards, telemetry units, and other standard components known in the aerospace and defense industries. Furthermore, control circuitry 14 may include, or cooperate with, any number of software programs or instructions designed to carry-out the various methods, process tasks, calculations, and control functions required of flight vehicle 10. Power supply 24 may assume the form of, for example, a battery pack.

In a preferred embodiment, load-bearing frame 26 is formed to include one or more mounting features (e.g., a mounting flange) to which control circuitry 14 may be attached, either directly or indirectly (e.g., via an intermediary mounting structure, such as an interface mounting plate). In one group of embodiments, load-bearing frame 26 is formed to include one or more recesses or cavities into which control circuitry 14 is installed. In the illustrated exemplary embodiment, specifically, control circuitry 14 is installed within an axial cavity 34 formed in end portion 28 of load-bearing frame 26. As is load-bearing frame 26, axial cavity 34 is formed to have a generally cylindrical geometry; however, the geometry and dimensions of cavity 34 may be varied, as appropriate, to accommodate components of varying shapes and sizes. As shown most clearly in FIG. 2, axial cavity 34 is formed to include three successive cylindrical sections or annuli, which decrease in diameter in a stepwise manner when moving from end portion 28 toward end portion 32 of frame 26. A first annular shelf 36, a second annular shelf 38, and a radial floor 40 are thus provided within cavity 34, which support the various components of control circuitry 14. In particular, as shown in FIG. 2, first annular shelf 36, a second annular shelf 38, and a radial floor 40 support PCB 20, PCB 22, and power supply 24, respectively. PCBs 20 and 22 are advantageously formed to have generally circular planform geometries and outer diameters slightly less than the inner diameters of shelves 36 and 38, respectively, to facilitate mounting within axial cavity 34. The components of control circuitry 14 can be secured in place utilizing, for example, adhesive bonding or a mechanical retaining means, such as one or more clamping devices.

Optical sensor system 18 may likewise be secured to a mounting feature disposed on or provided within electrically-interconnective support structure 12. In the illustrated example, optical sensor system 18 is installed within a second axial cavity 42 provided in end portion 32 of frame 26 (shown in FIG. 2). As is axial cavity 34, axial cavity 42 is formed to have a generally cylindrical, radially-stepped inner geometry. However, in contrast to cavity 34, axial cavity 42 includes only two cylindrical sections or annuli, which define a single annular shelf 44 and a radial floor 46 within cavity 42. When optical sensor system 18 is installed within axial cavity 42, annular shelf 44 supports a primary mirror assembly 50 included within system 18; while radial floor 46 supports a secondary mirror assembly 50 and a focal plane array 48, 52 included within system 18. Again, the components of optical sensor system 18 can be secured in place utilizing an adhesive, clamping devices, or other retaining means. By housing or embedding the various components of flight vehicle 10 within load-bearing frame 26, a highly compact and structurally robust system can be produced. A more balanced mass distribution of flight vehicle 10 is also achieved by mounting control electronics 14 (and/or other components deployed onboard vehicle 10) to first end portion 28 of load-bearing frame 26, while optical sensor system 18 (and possibly other components) are mounted to opposing end portion 32 of frame 26. As previously stated, various other components and systems can also be integrated into flight vehicle 10, as desired, utilizing a similar mounting and electrical interconnection technique to reduce assembly and manufacturing errors with the integrated system.

The capability of an electrically-interconnective support structure to both physically support and operably interconnect a number of different components deployed onboard flight vehicle is particularly advantageous in the integration of those components requiring precise calibration and alignment prior to operation. With respect to the exemplary embodiment, in particular, the ability to mount optic sensor system 18 directly to electrically-interconnective support structure 12 greatly simplifies post-mounting calibration and alignment with other components deployed onboard flight vehicle 10, such an inertial measurement unit (not shown). In this manner, electrically-interconnective support structure 12 enables the production of a highly integrated flight vehicle that is less costly and provides improved performance relative to conventional flight vehicles including multiple pre-build subsystems, which are integrated during a final assembly stage to provide the complete or "full-up" system. As a still further advantages, by mounting optical sensor system 18 and other vibration-sensitive components directly to support structure 12, the number of structural interconnection points can be reduced to commonize the frequency response along force disturbance paths and thereby minimize vibratory disturbances transmitted to the vibration-sensitive components during operation of flight vehicle 10.

A plurality of electrical conductors 54 is embedded within load-bearing frame 26 (only two electrical conductors 54 are shown in FIG. 2 for clarity). Electrical conductors 54 electrically couple control circuitry 14 to the solid-propellant rocket motors included within array 16. Electrical conductors 54 may also electrically interconnect the components of control circuitry 14 (e.g., PCB 20, PCB 22, and power supply 24), as well as the various other components deployed onboard flight vehicle 10 (e.g., focal plane array 52 of optical sensor system 18). Electrical conductors 54 may comprise any type of electrically-conductive element, such as interconnect lines, traces, entrenched wires, or the like, that can be embedded within load-bearing frame 26 in the manner described below in conjunction with FIG. 4. As shown in FIG. 2, electrical conductors 54 terminate in contacts 56, which electrically engage corresponding contacts provided on PCB 20 of control circuitry 14 when flight vehicle 10 is assembled. Contacts 56 may assume any structural form suitable for electrical communication with PCB 20 including, but not limited to, conductive bumps, balls, or pins. As further illustrated in FIG. 1, contacts 56 may be included within an array of contacts, which are circumferentially distributed about the outer radial face of shelf 36. This array of contacts is placed in electrical communication with corresponding contacts provided on the underside of PCB 20 when PCB 20 is installed within axial cavity 34. A similar interconnection interface may also be utilized to electrically interconnect PCB 22 and/or other devices included within vehicle 10.

Figure 3:
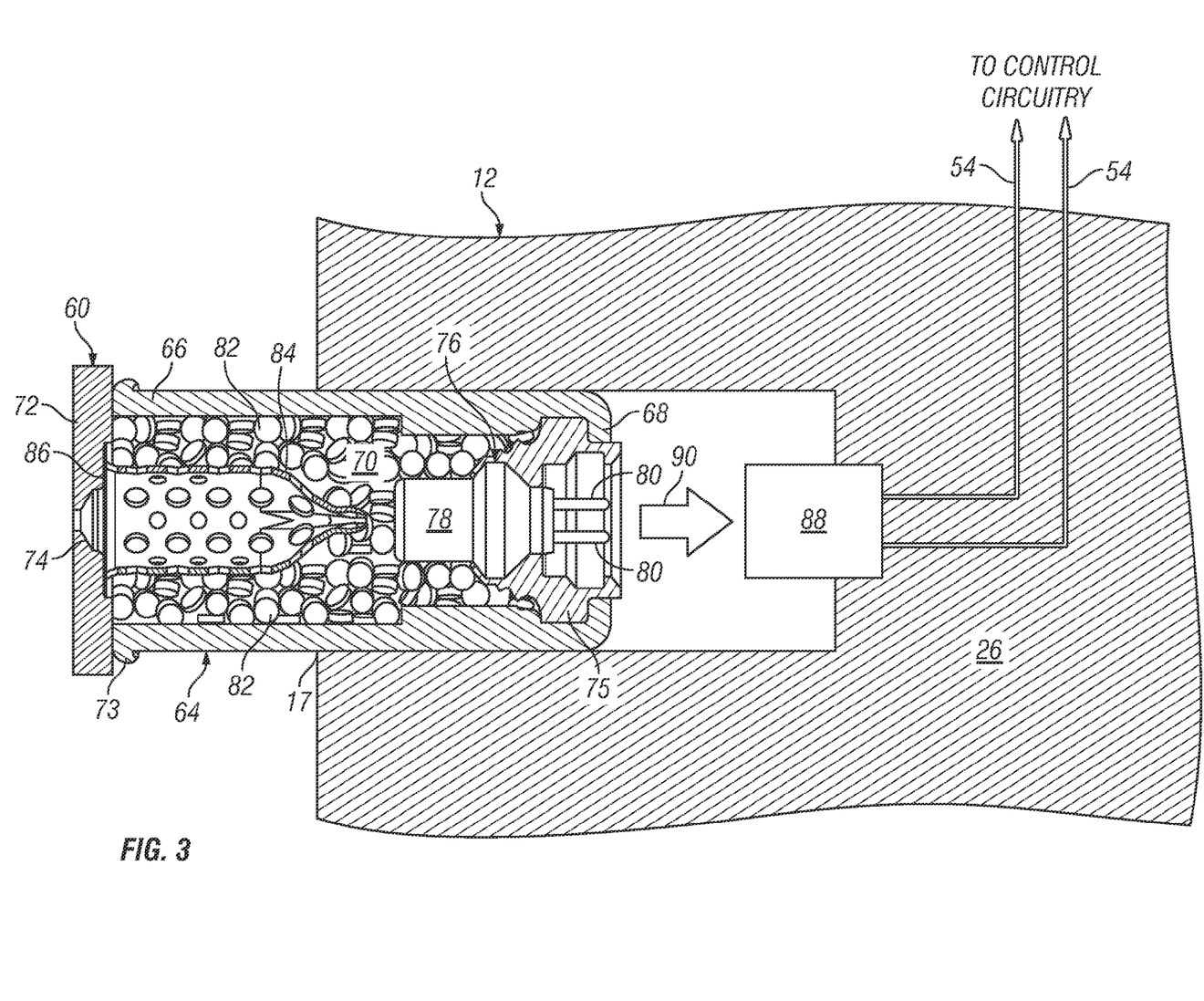
FIG. 3 is a cross-sectional view illustrating one manner in which the rocket motor may be received within a radial opening provided through an outer annular wall of the electrically-interconnective support structure shown in FIGS. 1 and 2.

FIG. 3 is a cross-sectional view of a solid-propellant rocket motor 60 included within rocket motor array 16 and a portion of electrically-interconnective support structure 12 having a radial opening 17 into which motor 60 is inserted during assembly. Radial opening 17 may be molded directly into electrically-interconnective support structure 12 or, instead, formed utilizing a secondary machining process. As can be seen in FIG. 3, two embedded conductors 54 terminate in a point-of-contact 88 provided on an interior surface of frame 26 proximate opening 17. In the illustrated example, point-of-contact 88 assumes the form of a female connector terminal and will consequently be referred to as "connector terminal 88" hereafter; it is, however, noted that the point-of-contact can assume any form suitable for electrical coupling conductors 54 to solid-propellant rocket motor 60. When motor 60 is inserted into opening 17 as indicated in FIG. 3 by arrow 90, an electrical connection is reliably formed between rocket motor 60 and control circuitry 14 (FIGS. 1 and 2). In the illustrated exemplary embodiment wherein support structure 12 is fabricated to have a solid or non-hollow cylindrical shape, radial openings 17 may assume the form of socket-like blind bores, which extend radially into, but do not fully penetrate, frame 26. In alternative embodiments, support structure 12 may be fabricated to have a hollow cylindrical or tubular geometry, and radial openings 17 may penetrate fully through the outer annular wall of structure 12. In this latter case, rocket motor 60 may be specially-adapted for electrical interconnection with conductors embedded within structure 12, as described more fully below in conjunction with FIG. 7.

Although the particular construction of solid-propellant rocket motor 60 will vary amongst different embodiments of flight vehicle 10, a brief description of one possible implementation of rocket motor 60 is set-forth below to provide a complete context in which embodiments of the present invention may be understood. Thus, by way of non-limiting example, FIG. 3 illustrates an embodiment of solid-propellant rocket motor 60 wherein rocket motor 60 includes an elongated tubular casing 64 having an outer end 66, an inner end 68, and a cylindrical cavity 70. An end cap 72, which has a convergent nozzle 74 formed therethrough, is fixedly joined over outer end 66 of casing 64; e.g., end cap 72 may be friction welded to outer end 66, as indicated in FIG. 3 by friction weld seam 73. A plug member 75 is inserted into inner end 68 of casing 64 and cooperates with end cap 72 to enclose cavity 70. An ignition device 76 is positioned within rocket motor 60 and includes an ignition charge 78 and igniter electrodes 80. A plurality of solid fuel pellets 82 is loaded into cavity 70 around ignition charge 78, although it will be readily appreciated that the solid propellant may assume other forms in alternative embodiments (e.g., a stack of annular or disc-shaped wafers). A tubular perforated pellet retainer 84 extends inwardly from end cap 72 into cavity 70 to help retain pellets 82 in an annular distribution and, during combustion of solid fuel pellets 82, to prevent larger debris from escaping through nozzle 74. Lastly, a burst disc 86 is secured over the inlet of convergent nozzle 74 and, when intact, blocks fluid flow through nozzle 74.

When actuated by control circuitry 14 (FIGS. 1 and 2), ignition device 76 detonates to ignite solid fuel pellets 82, which then burn in a controlled manner to produce exhaust gases. As pellets 82 burn, the pressure within cavity 70 accumulates until the force exerted on the exposed inner face of burst disc 86 surpasses a predetermined threshold. When this occurs, burst disc 86 ruptures and dislodges from the inlet of convergent nozzle 74. High velocity (e.g., supersonic) gas flow is thus permitted to flow through nozzle 74 and generate a predetermined thrust impulse, which acts on support structure 12 to impart desired movement to flight vehicle 10. Several rocket motors included within array 16 (FIGS. 1 and 2) may be fired simultaneously or in a timed sequence to complete a desired attitude or divert maneuver of flight vehicle 10.

Turning now to the manufacture of flight vehicle 10 and, specifically, of electrically-interconnective support structure 12, it is emphasized that electrically-interconnective support structure 12 can be fabricated utilizing any one of a different number of manufacturing techniques. In certain embodiments, electrically-interconnective support structure 12 may be formed utilizing a molding process (e.g., injection molding) such that load-bearing frame 26 is effectively formed around electrical conductors 54. However, in preferred embodiments, load-bearing frame 26 is formed, at least in part, from multiple layers of a woven material, which are initially built-up or compiled in a multi-step, laminate-type process, and then subsequently impregnated with a binder material and cured to impart frame 26 with the desired rigidity and structural strength. An example of one manner in which load-bearing frame 26 can be fabricated from multiple layers of woven material is described below in conjunction with FIG. 4.

Figure 4:
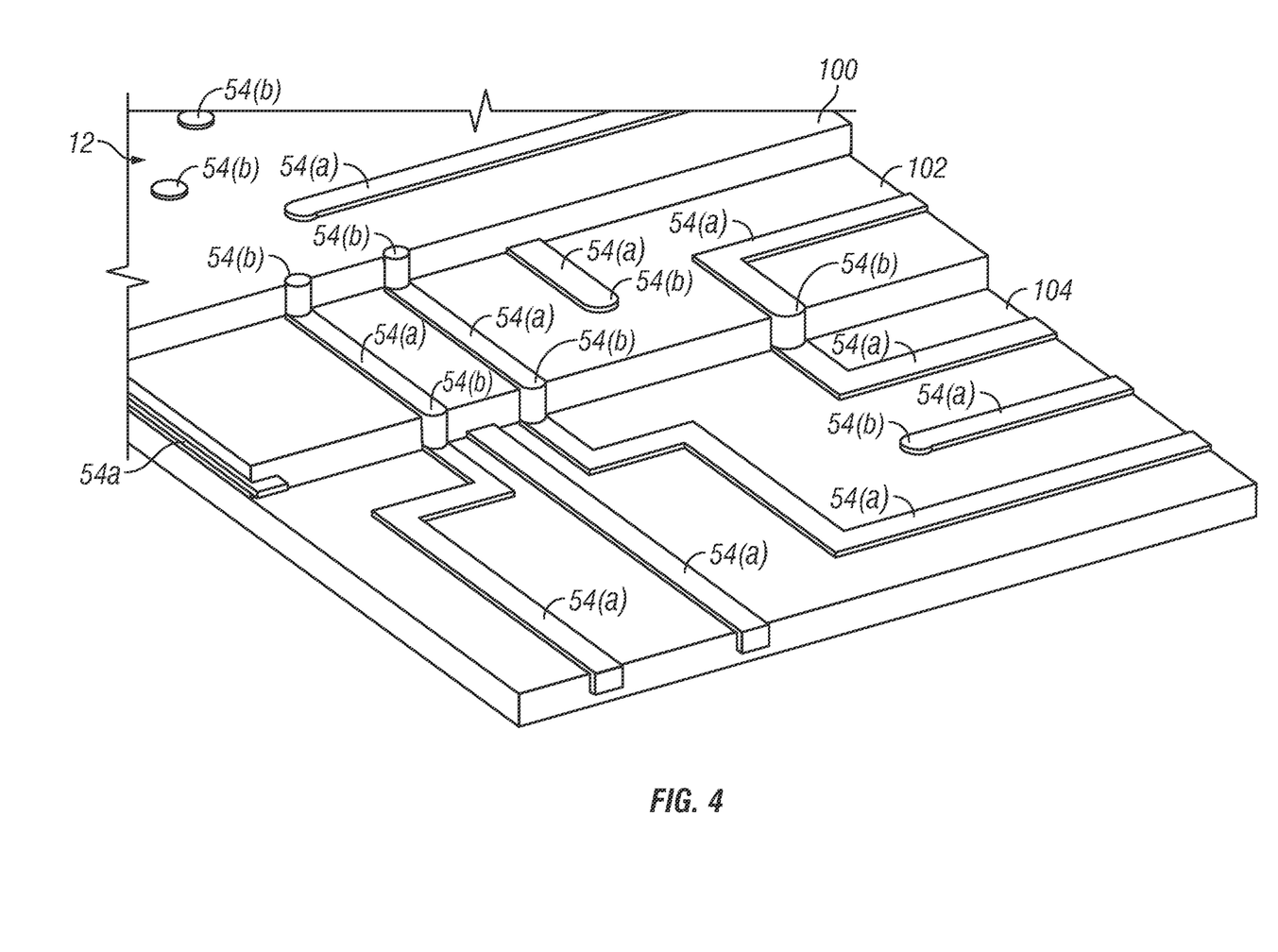
FIG. 4 is a cutaway view of a portion of the electrically-interconnective support structure shown in FIGS. 1-3 and illustrating an exemplary embodiment wherein the electrically-interconnective support structure is fabricated, in part, from multiple layers of a woven material.

FIG. 4 is an isometric cutaway view of a portion of electrically-interconnective support structure 12 in accordance with an exemplary embodiment. In the illustrated example, the depicted portion of load-bearing frame 26 includes three woven layers, namely, a first woven layer 100, a second woven layer 102, and a third woven layer 104. As previously indicated, a plurality of electrical conductors 54 is embedded within frame 26. As shown in FIG. 4, electrical conductors 54 may include a plurality of conductive interconnect lines 54(a) (e.g., traces), which extend along axes generally parallel to the major planes of woven layers 100, 102, and 104; and a plurality of vias 54(b) (e.g., blind vias, buried vias, plated through-holes, metal plugs, etc.), which extend through one or more of layers 100, 102, and 104 to electrically interconnect conductive interconnect lines 54(a) and/or provide contacts to which external devices may be electrically coupled during assembly of flight vehicle 10. Conductive interconnect lines 54(a) may be formed utilizing processes conventionally-known within the semiconductor industry, such as the processes utilized to form metallization layers during Back-End-of-the-Line processing. In one specific implementation, a damascene process is utilized to form conductive interconnect lines 54(a) wherein woven layers 100, 102, and 104 are first etched to create a pattern therein in accordance with a predetermined layout design; the pattern is then filled with a conductive material (e.g., copper) deposited utilizing a chemical vapor deposition or another conventionally-known deposition process; and the excess conductive material is then removed utilizing, for example, a chemical mechanical planarization (CMP) process. Vias 54(b) can likewise be formed utilizing a number of conventionally-known material removal processes (e.g., laser drilling and anisotropic etching) and deposition processes. Conductive materials suitable for usage in the formation of interconnect lines 54(a) and vias 54(b) include, but are not limited to, conductive semiconductor materials (e.g., polysilicon, germanium, gallium arsenide, silicon carbide, or the like), metals (e.g., copper and tungsten), and alloys (e.g., copper-based alloys).

The woven materials from which layers 100, 102, and 104 are fabricated will vary depending the desired mission capabilities of flight vehicle 10. It is, however, generally preferred that woven layers 100, 102, and 104 are each fabricated from a relatively lightweight, structurally robust woven material, such as a fiber-reinforced polymer. In one embodiment, woven layers 100, 102, and 104 are each formed from one or more sheets of woven carbon filaments (commonly referred to as "carbon graphite"), which are subsequently impregnated with a plastic resin to form a carbon fiber-reinforced plastic material. Generally, carbon graphite provides excellent tensile strength, low weight, and low thermal expansion and is consequently well-suited for aerospace applications. Other materials potentially suitable for usage in the formation of layers 100, 102, and 104 include fiberglass-reinforced polymers and metal matrix composites, such as cermets.

In embodiments wherein load-bearing frame 26 is formed, at least in part, from a plurality of woven layers, electrically-interconnective support structure 12 may be fabricated in the following manner. Woven layer 104 may first be laid down in a substantially planar or flat orientation. Selected electrical conductors 54 may then be formed over the exposed upper surface of layer 104 utilizing conventionally-known patterning and deposition processes of the type described above. Woven layer 102 may then be rolled onto or otherwise positioned over the patterned surface of woven layer 104. Additional electrical conductors 54 may then be formed over the exposed upper surface layer 104. This process may be repeated until a flexible laminate structure is produced containing a predetermined number of woven layers and a desired network of interconnect lines embedded within the woven layers. The laminate structure may then be bent, folded, or otherwise physically manipulated into a desired shape, impregnated with one or more binder materials (e.g., a liquid adhesive), and then cured to fix the laminate structure in a desired shape. Finally, structure 12 may be subjected to post-cure machining to fine tune the dimensions of structure 12 and/or to impart structure 12 additional structural features (e.g., cavities, bores, or recesses) to facilitate the assembly-stage mounting of rocket motors 16, control circuitry 14, and the other components of flight vehicle 10. In one specific implementation, the woven material layers and the electrical conductors are wrapped around a cylindrical mandrel prior to curing to impart structure 12 with a generally tubular or annular shape, such as that described below in conjunction with FIG. 5.

Electrically-interconnective support structure 12 permits each major component to be secured in its designated position and subsequently integrated into its mating subsystem in a highly controllable, stepped process. Such a fabrication process allows multiple different types of components (e.g., sensor suites, cryogenic cooling systems, threat defeat systems, telemetry systems, inertial measurement units, etc.) to be incorporated into a single, integrated system to reduce assembly and manufacturing errors that may otherwise occur during flight vehicle production. In addition, such a fabrication process is readily amenable to automation and, thus, can be performed with minimal manual assistance. By minimizing manual assembly tasks, such as the hand-soldering of discrete wired connections, the introduction of foreign object debris into the system can be reduced or eliminated thereby improving overall system reliability. As a further advantage, the electrical interconnections provided by electrically-interconnective support structure 12 can be verified (e.g., checked for continuity utilizing in-line testing equipment) prior to assembly of flight vehicle 10. This permits immediate testing of control circuitry 14 after installation on structure 12 to streamline fault detection processes.

Figure 5:
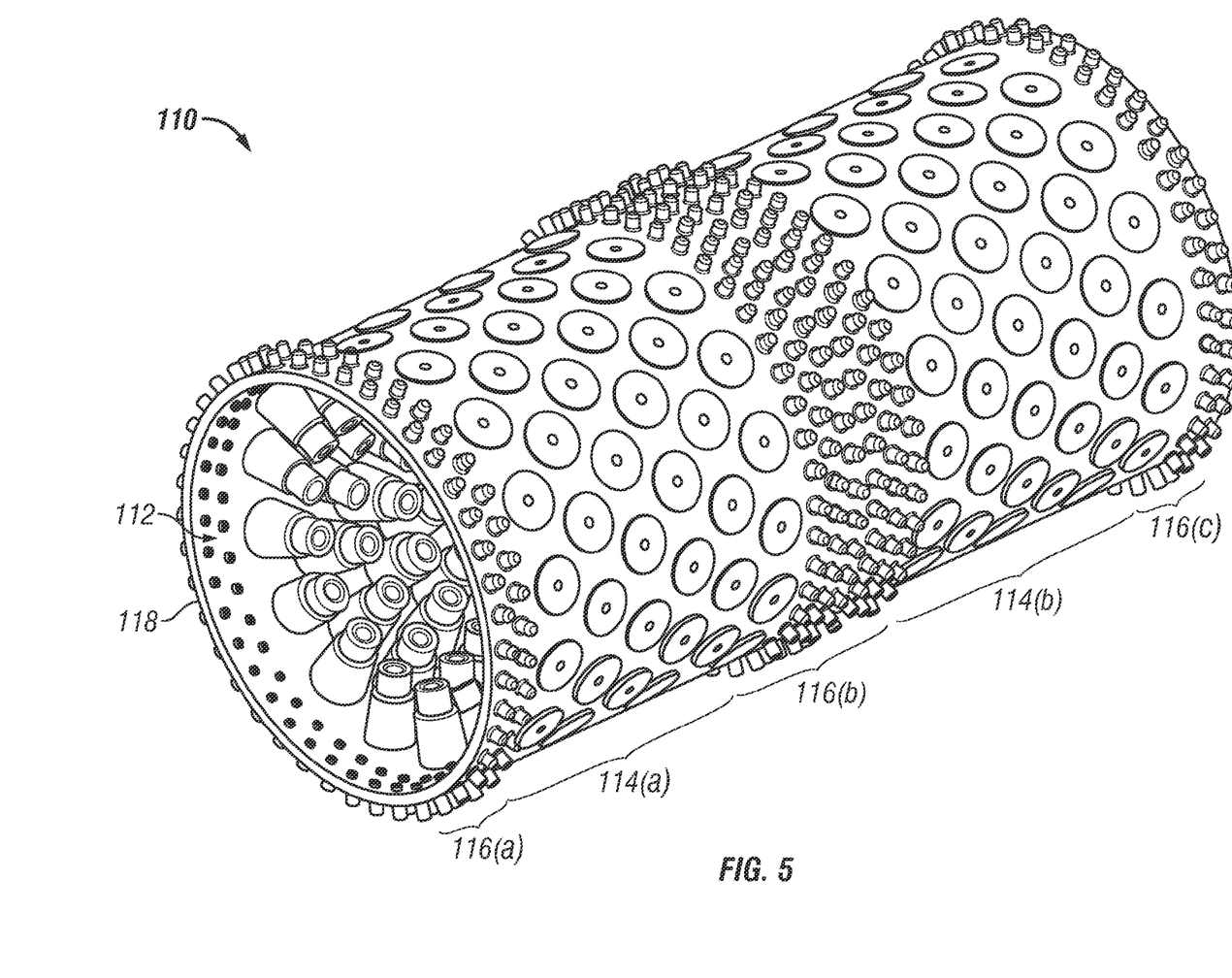
FIGS. 5 and 6 are isometric and end views, respectively, of a flight vehicle including a tubular electrically-interconnective support structure, an array of divert thrusters, and an array of attitude control thrusters and illustrated in accordance with a further exemplary embodiment.
Figure 6:
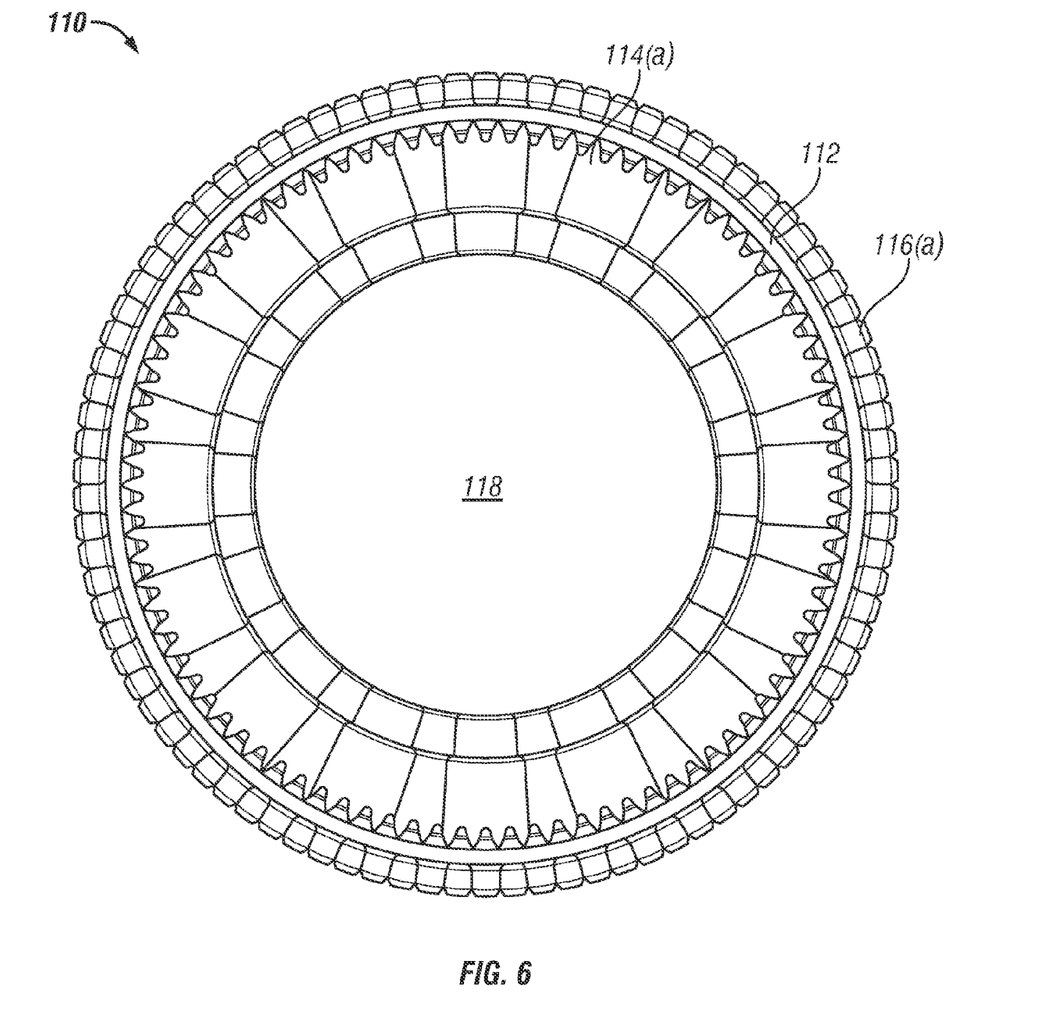

FIGS. 5 and 6 are isometric and end views, respectively, of a flight vehicle 110 illustrated in accordance with a further exemplary embodiment of the present invention. In this example, propulsion system includes an electrically-interconnective support structure 112, a circumferentially-spaced divert rocket motor array 114, and a circumferentially-spaced attitude control rocket motor array 116. Divert rocket motor array 114 is interspersed with attitude control rocket motor array 116 along the longitudinal axis of electrically-interconnective support structure 112. More specifically, divert rocket motor array 114 is divided into two annular groupings or formations, 114(a) and 114(b); and attitude control rocket motor array 116 is divided into three annular formations, 116(a), 116(b), and 116(c), which are spaced in an alternating pattern with divert rocket motor formations 114(a) and 114(b). Each of the rocket motors included within rocket motor arrays 114 and 116 preferably assumes the form of a solid-propellant rocket motor similar to rocket motor 60 described above in conjunction with FIG. 3. In this particular example, electrically-interconnective support structure 112 is imparted with a substantially tubular or annular geometry and includes a longitudinal opening or tunnel 118 therethrough (shown most clearly in FIG. 6). Notably, in embodiments wherein support structure 112 is formed from a composite material of the type described above, the considerable structural strength of the composite material enables support structure 112 to be fabricated with a relatively thin-walled tubular construction (again, shown most clearly in FIG. 6). Such a structural configuration reduces the overall weight of electrically-interconnective support structure 112 and enables components deployed onboard flight vehicle 110 (e.g., control circuitry, an optical sensing system, an inertial measurement unit, etc.) to be housed within tunnel 118.

Figure 7:
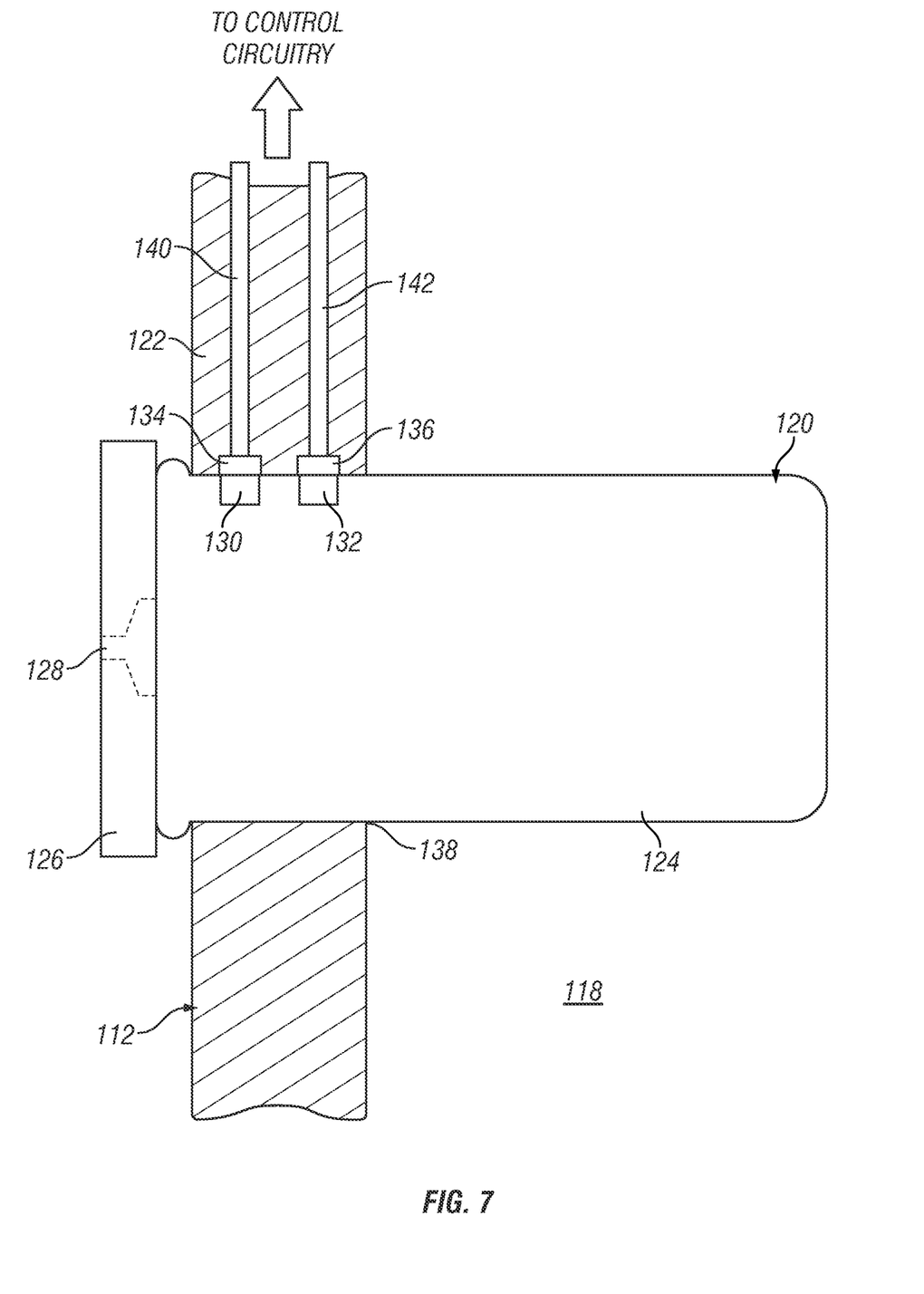
FIG. 7 is a side view of a thruster extending through a radial opening provided in an annular wall of the support structure shown in FIGS. 5 and 6.

FIG. 7 is an isometric view of a rocket motor 120 included within array 114 and a portion of an outer annular wall 122 of support structure 112 (shown in cross-section). As was the case previously, rocket motor 120 includes an elongated tubular casing 124 and an end cap 126, which is affixed to the outer end of casing 124 and which has a nozzle 128 formed therethrough (shown in phantom in FIG. 7). Rocket motor 120 further includes first and second motor contacts 130 and 132, which are provided on an outer circumferential portion of casing 124 proximate end cap 126. Motor contacts 130 and 132 are electrically coupled to an igniter positioned within rocket motor 120 (hidden from view in FIG. 7). A corresponding pair of support structure contacts 134 and 136 is disposed on an inner surface of support structure 112, which defines a radial opening 138 through outer annular wall 122 (generically referred to as a "point-of-contact"). As indicated in FIG. 7, casing 124 of rocket motor 120 may be matingly received through radial opening 138 when flight vehicle 110 is assembled. Contacts 134 and 136 are electrically to control circuitry (not shown) by way of first and second conductors 140 and 142, respectively, embedded within wall 122 of support structure 112. Support structure contacts 134 and 136 are positioned such that, when rocket motor 120 is properly positioned through radial opening 138, contacts 134 and 136 slidably engage motor contacts 130 and 132, respectively, to electrically couple the igniter of rocket motor 120 to the flight vehicle control circuitry. The various other rocket motors included within arrays 114 and 116 may also be electrically coupled to the control circuitry in a similar manner, as may the other electronic components (e.g., sensor suites, cryogenic cooling systems, threat defeat systems, telemetry systems, etc.) deployed onboard flight vehicle 110. In this manner, electrically-interconnective support structure 112 electrically couples the control circuitry to rocket motor 120 and the other rocket motors included within arrays 114 and 116 without requiring discrete wired connections. Flight vehicle 110 is consequently amenable to a highly automated manufacturing process, which reduces manual labor demands and, therefore, manual faults and debris that may otherwise be introduced into a traditionally-manufactured system.

The foregoing has thus provided embodiments of a flight vehicle (e.g., an exoatmospheric maneuvering vehicle) that is relatively lightweight, that has a reduced part count, that is highly modular, and that can be outfitted with different electronic components (e.g., cryogenic cooling systems, telemetry systems, threat defeat systems, sensor suites, and the like) to provide a wide range of mission capabilities. Additionally, as embodiments of the above-described flight vehicle enable the integration of various disparate component types, a significant reduction in assembly costs and manufacturing errors is achieved. Improvements in cost savings and performance are especially pronounced in embodiments wherein the flight vehicle includes optical sensor systems, inertial measurement units, and other such components, which can be precisely calibrated and aligned, as required, after mounting to the electrically-interconnective support structure. In the above-described exemplary embodiments, the flight vehicle is amenable to automated manufacture to further decrease the likelihood of manually-introduced system faults and foreign object debris into the system.

The foregoing has also provided embodiments of a method for manufacturing a flight vehicle. In one embodiment, the method includes the steps of fabricating an electrically-interconnective support structure including a load-bearing frame and a plurality of electrical conductors embedded within the load-bearing frame, and the step of mounting a solid-propellant rocket motor to the load-bearing frame in a predetermined position to electrically couple the ignition device to the plurality of electrical conductors embedded within the load-bearing frame. In certain implementations, the method may also include the steps of mounting an optical sensor system to the load-bearing frame and calibrating the optical sensor system. An inertial guidance unit may optionally be mounted to the load-bearing frame and aligned with the optical sensor system. In further embodiments, the step of fabricating electrically-interconnective support structure comprises forming a radial opening in the load-bearing frame, and providing a point-of-contact to the plurality of electrical conductors proximate the radial opening. The step of mounting may comprise inserting the solid-propellant rocket motor into the radial opening to place the igniter electrodes in electrical contact with the plurality of electrical conductors. In still further embodiments, the step of fabricating the electrically-interconnective support structure comprises providing a first woven layer, forming at least a portion of the plurality of electrical conductors on the first woven layer, placing a second woven layer over the first woven layer, impregnating the first woven layer and the second woven layer with a binder material, and curing the first woven layer and the second woven layer. The first woven layer and the second woven layer may be bend, folded, or otherwise physically manipulated into a desired shape prior to curing.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A flight vehicle, comprising:
   a solid-propellant rocket motor;
   control circuitry; and
   an electrically-interconnective support structure, comprising:
   a singular load-bearing frame to which the rocket motor and the control circuitry are mounted such that the rocket motor and the control circuitry are non-rotatable relative to one another, the load bearing frame comprising first, second and third woven layers; and
   a plurality of electrical conductors embedded within the load-bearing frame and electrically coupling the rocket motor to the control circuitry,
   a first portion of the electrical conductors being disposed on a surface of the third woven layer between the second and third woven layers, and
   a second portion of the electrical conductors being disposed on a surface of the second woven layer between the first and second woven layers.

2. A flight vehicle according to claim 1 further comprising a rocket motor array including the rocket motor and mounted around the load-bearing frame.

3. A flight vehicle according to claim 2 wherein the rocket motor array is circumferentially-spaced about a longitudinal axis of the flight vehicle.

4. A flight vehicle according to claim 1 wherein the electrically-interconnective support structure has a generally cylindrical outer geometry.

5. A flight vehicle according to claim 1 wherein the rocket motor is mounted to an intermediate portion of the load-bearing frame, and wherein the control circuitry is mounted to a first end portion of the load-bearing frame.

6. A flight vehicle according to claim 5 wherein the first end portion includes a cavity in which the control circuitry is disposed.

7. A flight vehicle according to claim 5 further comprising an optical sensor system mounted to a second end portion of the electrically-interconnective support structure substantially opposite the control circuitry.

8. A flight vehicle according to claim 1 wherein the load-bearing frame comprises an opening through which the rocket motor extends.

9. A flight vehicle according to claim 8 wherein the load-bearing frame comprises an annular wall, and wherein the opening comprises a radial opening formed in the annular wall.

10. A flight vehicle according to claim 8 wherein the plurality of electrical conductors comprise a point-of-contact formed on the load-bearing frame proximate the radial opening and electrically coupled to the rocket motor.

11. A flight vehicle according to claim 1 wherein the first, second and third woven layers of the load-bearing frame comprises a fiber reinforced polymer.

12. A flight vehicle, comprising:
an electrically-interconnective support structure, comprising:
a singular load-bearing frame having an outer annular wall and comprising first, second and third woven layers; and
a plurality of electrical conductors embedded within the load-bearing frame, a first portion of the electrical conductors being disposed on a surface of the third woven layer between the second and third woven layers and a second portion of the electrical conductors being disposed on a surface of the second woven layer between the first and second woven layers;
a solid-propellant rocket motor, comprising:
a rocket motor casing extending through the outer annular wall;
a solid propellant disposed within the rocket motor casing; and
an ignition device disposed within the rocket motor casing adjacent the solid propellant and electrically coupled to the plurality of electrical conductors embedded within the load-bearing frame,
wherein the rocket motor and control circuitry to which the rocket motor is coupled are mounted to the singular load-bearing frame such that the rocket motor and the control circuitry are non-rotatable relative to one another.

* * * * *